(12) United States Patent  (10) Patent No.: US 8,023,253 B1
Arboleda  (45) Date of Patent: Sep. 20, 2011

(54) ENCLOSURE AND OPERABLE STORAGE SYSTEM

(76) Inventor: Edwin N. Arboleda, Glen Head, NY (US)

( * ) Notice: Subject to any disclaimer, the term of this patent is extended or adjusted under 35 U.S.C. 154(b) by 44 days.

(21) Appl. No.: 12/175,591

(22) Filed: Jul. 18, 2008

Related U.S. Application Data

(63) Continuation-in-part of application No. 11/766,971, filed on Jun. 22, 2007, now abandoned.

(51) Int. Cl.
*H05K 5/00* (2006.01)

(52) U.S. Cl. ............... 361/679.02; 361/679.31; 446/175

(58) Field of Classification Search ............ 361/679.02, 361/679.01, 679.31; 446/175, 268, 297
See application file for complete search history.

(56) References Cited

U.S. PATENT DOCUMENTS

| | | | | |
|---|---|---|---|---|
| 5,517,407 A | * | 5/1996 | Weiner | 704/1 |
| 5,534,888 A | * | 7/1996 | Lebby et al. | 345/672 |
| 5,707,240 A | * | 1/1998 | Haas et al. | 434/317 |
| 5,844,775 A | * | 12/1998 | Lundberg | 361/679.08 |
| 5,897,324 A | * | 4/1999 | Tan | 434/317 |
| RE37,929 E | * | 12/2002 | Fernandez | 345/173 |
| 6,494,762 B1 | * | 12/2002 | Bushmitch et al. | 446/268 |
| 6,741,461 B1 | * | 5/2004 | Owoeye et al. | 361/679.6 |
| 6,848,965 B2 | * | 2/2005 | Wong | 446/150 |
| 7,037,166 B2 | * | 5/2006 | Shrock et al. | 446/175 |
| 7,347,760 B2 | * | 3/2008 | Wood et al. | 446/175 |
| 7,509,270 B1 | * | 3/2009 | Hendricks et al. | 705/26 |
| 2006/0133664 A1 | * | 6/2006 | Hong et al. | 382/154 |
| 2007/0159779 A1 | * | 7/2007 | Chang | 361/683 |
| 2008/0005420 A1 | * | 1/2008 | Spector et al. | 710/62 |
| 2008/0014829 A1 | * | 1/2008 | Dyer et al. | 446/297 |
| 2008/0109309 A1 | * | 5/2008 | Landau et al. | 705/14 |

* cited by examiner

*Primary Examiner* — Jayprakash N Gandhi
*Assistant Examiner* — Ingrid Wright
(74) *Attorney, Agent, or Firm* — Neustel Law Offices

(57) ABSTRACT

An enclosure and operable storage system for efficiently utilizing a toy, literature item, or other novelty item in conjunction with a personal computer. The enclosure and operable storage system generally includes an enclosure, wherein the enclosure is comprised of a portable configuration and playful configuration, or comprised of a book. A computer system including a memory device, at least one network adapter, and optionally a processing unit are positioned within the enclosure. At least one virtual application or virtual operating system is installed upon the memory device to be run by the processing unit of the host computer. Additionally, at least one external peripheral connector is connected to the computer system to connect to at least one peripheral device of a host computer.

11 Claims, 12 Drawing Sheets

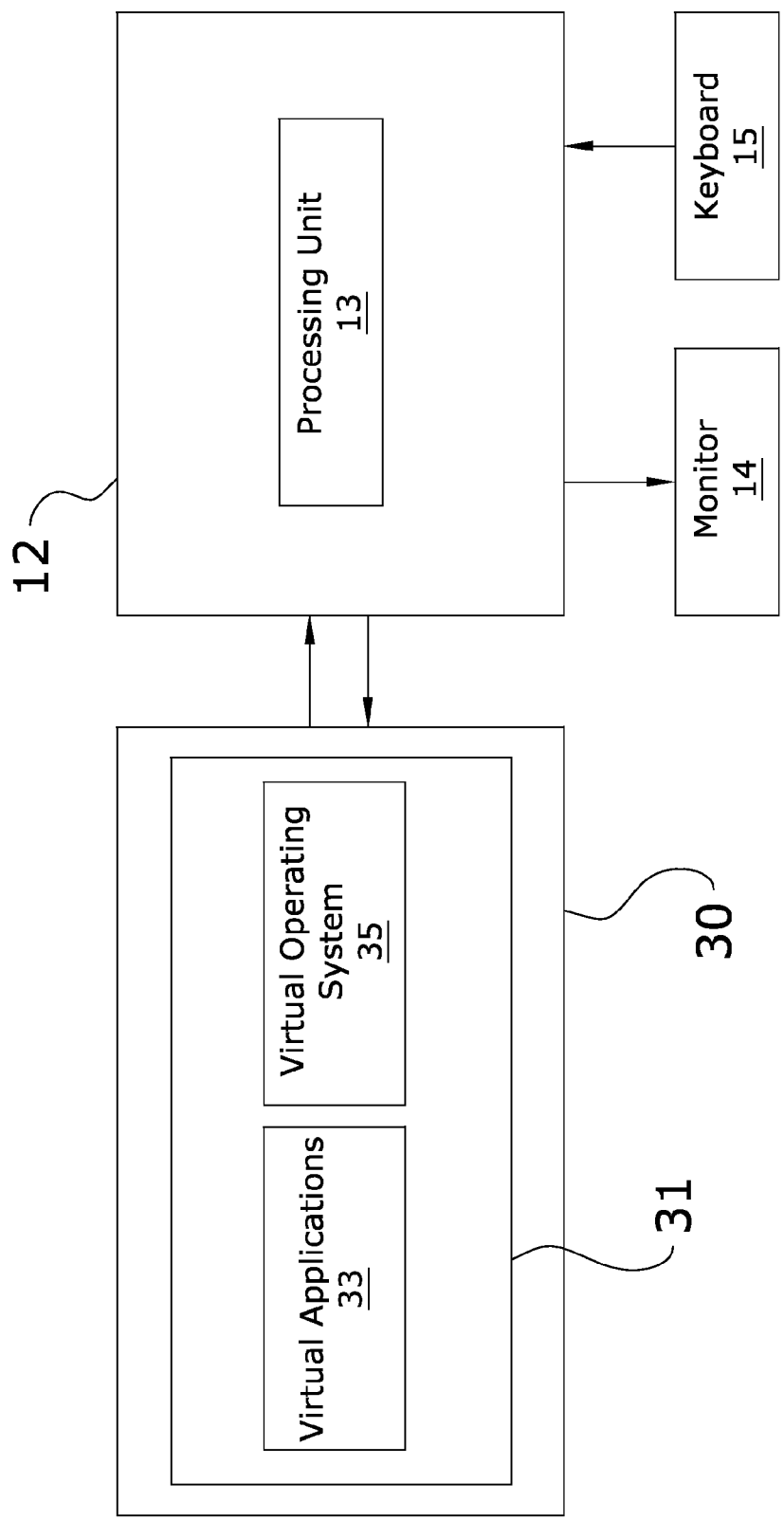

ENCLOSURE AND OPERABLE STORAGE SYSTEM

CROSS REFERENCE TO RELATED APPLICATIONS

I hereby claim benefit under Title 35, United States Code, Section 120 of U.S. patent application Ser. No. 11/766,971 filed Jun. 22, 2007 now abandoned. This application is a continuation in-part of the 11/766,971 application. The 11/766,971 application is currently pending. The 11/766,971 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to central processing units and more specifically it relates to an enclosure and operable storage system for efficiently utilizing a toy, literature item, or other novelty item as a personal computer or in conjunction with a personal computer.

2. Description of the Related Art

Any discussion of the related art throughout the specification should in no way be considered as an admission that such related art is widely known or forms part of common general knowledge in the field.

Central processing units have been in use for years. Typically, computers (i.e. personal computers) include various electronic components, such as but not limited to a motherboard, a CPU (i.e. microprocessor), mass storage device (i.e. hard drive), mass memory (i.e. RAM), power supply (e.g. AC, DC), expansion cards (e.g. graphics cards, sound cards, modem, etc.), optical disc drive, operating system (i.e. MICROSOFT, LINUX, etc.) and various other electronic components, mechanical components and software programs. Computers are also generally housed within a rectangular shaped enclosure and may connect to or include within various interface devices (e.g. monitor, keyboard, mouse, etc.).

The enclosure (i.e. rectangular shaped structure) associated with many computers may become mundane for many people over time. This can be especially prevalent with children, wherein some children may lose attention with unpleasant looking objects quickly. In today's ever increasing technology focused society, it is important for many individuals to learn computer skills at an early age. Because of this increasing need and the general lack of efficiency in the prior art, there is a need for a new and improved enclosure and operable storage system for efficiently utilizing a toy, literature item, or other novelty item as a personal computer or in conjunction with a personal computer.

BRIEF SUMMARY OF THE INVENTION

The general purpose of the present invention is to provide an enclosure and operable storage system that has many of the advantages of the central processing units mentioned heretofore. The invention generally relates to a central processing unit which includes an enclosure, wherein the enclosure is comprised of a portable configuration and playful configuration. A computer system including a memory device, a central processing unit and at least one network adapter is positioned substantially within the enclosure. At least one virtual application installed upon the memory device to be run by the central processing unit and at least one external peripheral connector connected to the computer system to connect to at least one peripheral device, such as a host computer.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an enclosure and operable storage system for efficiently utilizing a toy, literature item, or other novelty item as a personal computer or in conjunction with a personal computer.

Another object is to provide an enclosure and operable storage system that may operate as a stand-alone computer.

An additional object is to provide an enclosure and operable storage system that may virtually connect to a host computer.

A further object is to provide an enclosure and operable storage system that that includes various connection ports (e.g. USB, serial, etc.) to connect to various electrical devices (e.g. monitor, keyboard, mouse, separate computer system, etc.).

Another object is to provide an enclosure and operable storage system that increases the interest in computers for children.

Another object is to provide an enclosure and operable storage system that includes various software programs or applications (e.g. operating system, web browser, etc.).

Another object is to provide an enclosure and operable storage system that is comprised of various types of literature items, such as a book, greeting card, magazine or various others.

Another object is to provide an enclosure and operable storage system that is comprised of various types of novelty items, such as a golf ball, a packaging (e.g. for candy boxes, etc.).

Another object is to provide an enclosure and operable storage system that allows an individual to chose between more than one operating system (i.e. when connected to a host computer).

Another object is to provide an enclosure and operable storage system that allows an individual to utilize the central processing unit and other peripheral devices (i.e. monitor, keyboard, mouse, printer, etc.) of a host computer without disrupting the host computer's operating system.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 12 is an exemplary block diagram illustrating the enclosure and computer system using the processor unit of the host computer.

DETAILED DESCRIPTION OF THE INVENTION

A. Overview

Figure 1:
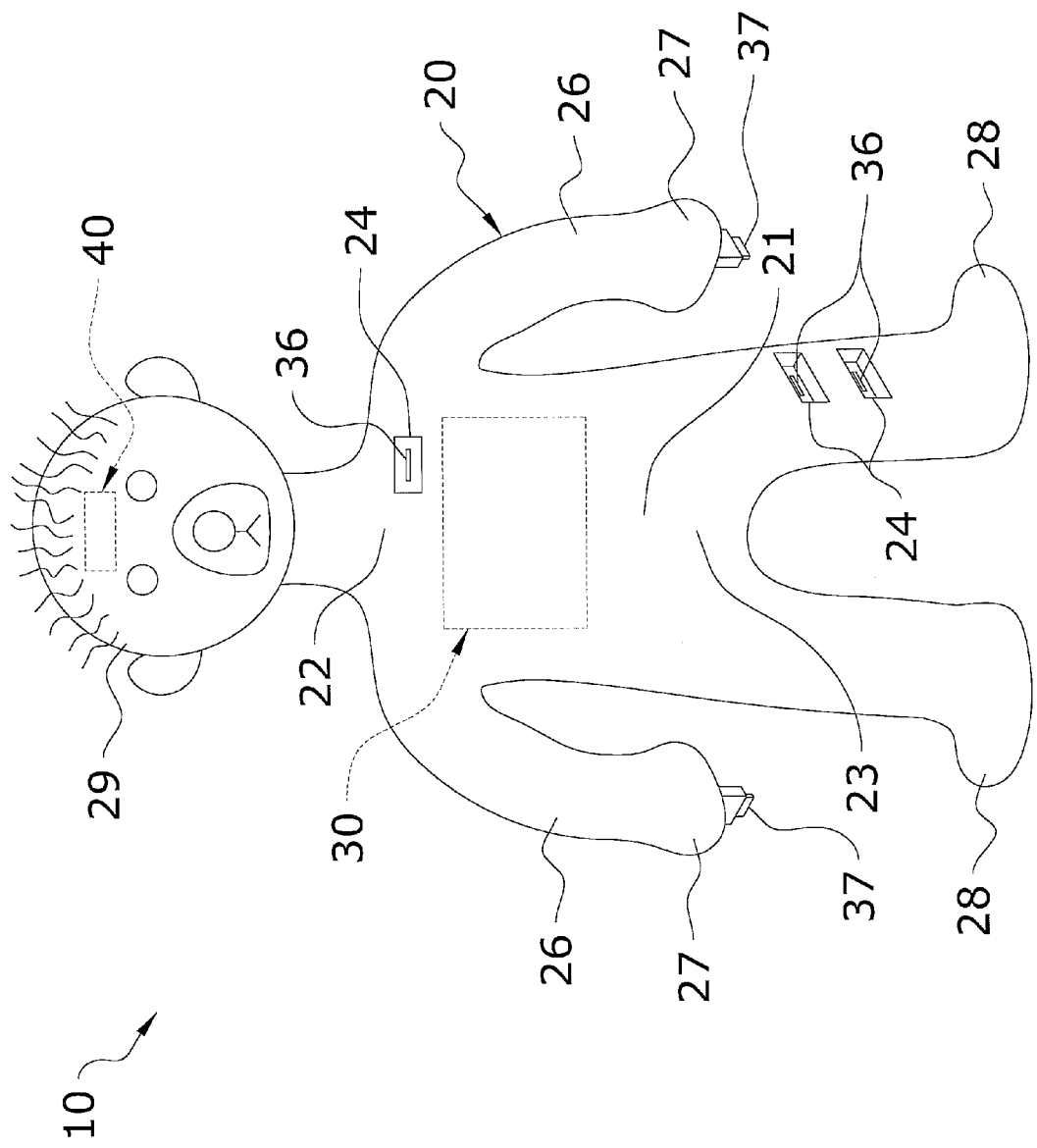
FIG. 1 is an upper perspective view of a first embodiment of the present invention.

Turning now descriptively to the drawings, in which similar reference characters denote similar elements throughout the several views, FIGS. 1 through 10 illustrate an enclosure and operable storage system 10, which comprises an enclosure 20, wherein the enclosure 20 is comprised of a portable configuration and playful configuration. A computer system 30 including a memory device 31, a central processing unit 32 and at least one network adapter 40 is positioned substantially within the enclosure 20. At least one virtual application 33 installed upon the memory device 31 to be run by the central processing unit 32 and at least one external peripheral connector 36, 37 connected to the computer system 30 to connect to at least one peripheral device, such as a host computer 12.

B. Enclosure

The enclosure 20 of the present invention may be comprised of various playful configurations, such as but not limited to configurations resembling a toy (e.g. transformer, board games, etc.) or a doll (e.g. stuffed animals, etc.), a literature item (e.g. books, magazines, greeting cards, binder of a book, etc.), or various novelty items (e.g. golf ball, keychain, packaging for candy boxes, etc.). The enclosure 20 may also be comprised of a rigid material (e.g. plastic, etc.) or a soft material (e.g. cloth, cotton, etc.). It is appreciated that the toy, doll, play set, literature or novelty item configuration of the enclosure 20 may resemble various other configurations. The enclosure 20 is further preferably comprised of a portable configuration. In an example of the literary item embodiment of the enclosure 20. An individual could plug a "best seller" into the host computer 12 and receive additional content about the book, educational lessons, upcoming events and various other types of information.

In one embodiment (i.e. doll configuration) the enclosure 20 includes a body portion 21, a pair of first extended portions 26 (i.e. arms), a pair of second extended portions 28 (i.e. legs) and a third extended portion 29 (i.e. head). The body portion 21 includes a first end 22 and a second end 23 opposite the first end 22 as illustrated in FIGS. 1 through 4. The body portion 21 may also include an input connector 36 extending within a slot 24 of the body portion 21. The slot 24 allows the input connector 36 to be recessed slightly within the enclosure 20. The memory device 31 and/or central processing unit 32 are also preferably positioned within the body portion 21.

The first extended portions 26 (i.e. arms) preferably extend outwardly from the first end 22 of the body portion 21 and are each preferably comprised of an arm configuration. The outer end 27 (i.e. opposite the body portion 21) of each of the first extended portions 26 preferably includes an output connector 37. The outer end 27 is also preferably distally spaced from the body portion 21. It is appreciated that the first extended portions 26 may also each include various computer components within the first extended portions 26.

The second extended portions 28 (i.e. legs) preferably extend outwardly from the second end 23 of the body portion 21 and are each preferably comprised of a leg configuration. The second extended portions 28 preferably each include at least one input connector 36 positioned within a slot 24 of the second extended portions 28. It is appreciated that the second extended portions 28 may also each include various computer components within the second extended portions 28.

The third extended portion 29 (i.e. head) preferably extends outwardly from the first end 22 of the body portion 21 and is preferably comprised of a head configuration. The third extended portion 29 further preferably extends outwardly between the first extended portions 26. The network adapter 40 is preferably positioned within the third extended portion 29. It is appreciated that the third extended portion 29 may also include various other computer components within the third extended portion 29.

In another embodiment of the enclosure 20, wherein the enclosure 20 is comprised of a literature item such as a greeting card, the central processing unit 32 and/or memory device 31 is positioned between a pair of front sheets or a pair of back sheets of the greeting card. An output connector 37 of the greeting card 20 would then be able to communicatively plug (either directly or wirelessly) into the host computer 12 to perform various functions, such as but not limited to receive a message, play a video, play a recording, view a web page or various other functions.

In another embodiment of the enclosure 20, wherein the enclosure 20 is comprised of a literature item such as a book, the central processing unit 32 and/or memory device 31 is positioned within the binder of the book. An output connector 37 of the book 20 would then be able to communicatively plug (either directly or wirelessly) into the host computer 12 to perform various functions, such as but not limited to receive a message, play a video, play a recording, view a web page or various other functions. It is appreciated that the various other literary or novelty embodiments of the enclosure 20 may house the various components of the central processing unit, memory device, network adapter and others in various manners.

The enclosure 20 is comprised of a configuration to efficiently store a memory device 31 and the central processing unit 32, wherein the enclosure 20 prevents the memory device 31 and the central processing unit 32 from breaking, overheating and various other malfunctioning problems commonly associated with memory devices 30 and central processing units 32 common in the art. The enclosure 20 may include various fans or electrical/mechanical components common in the art of cooling electrical computer components.

The enclosure 20 also preferably includes at least one cavity extending within the enclosure 20 to efficiently secure the computer components (i.e. memory device 31, central processing unit 32, network adapter 40, etc.) and prevent the computer components from breaking or becoming unconnected from each other. The enclosure 20 may also include a means for accessing the computer components within the cavity to allow a user to replace or inspect the computer components of the memory device 31 and/or the central processing unit 32.

C. Power Supply

It is also appreciated that the present invention may include a power supply 34 to provide power to the central processing unit 32, memory device 31 and various other components to be run by computer system 30 within the enclosure 20. The power supply 34 may be comprised of a battery common in the art of laptops. The present invention may also include an AC cord adapted to plug into a wall receptacle and provide an adequate amount of power to run the central processing unit 32. It is also appreciated that the present invention may receive power from the host computer 12 via a connector 36, 37.

D. Computer System

Figure 2:
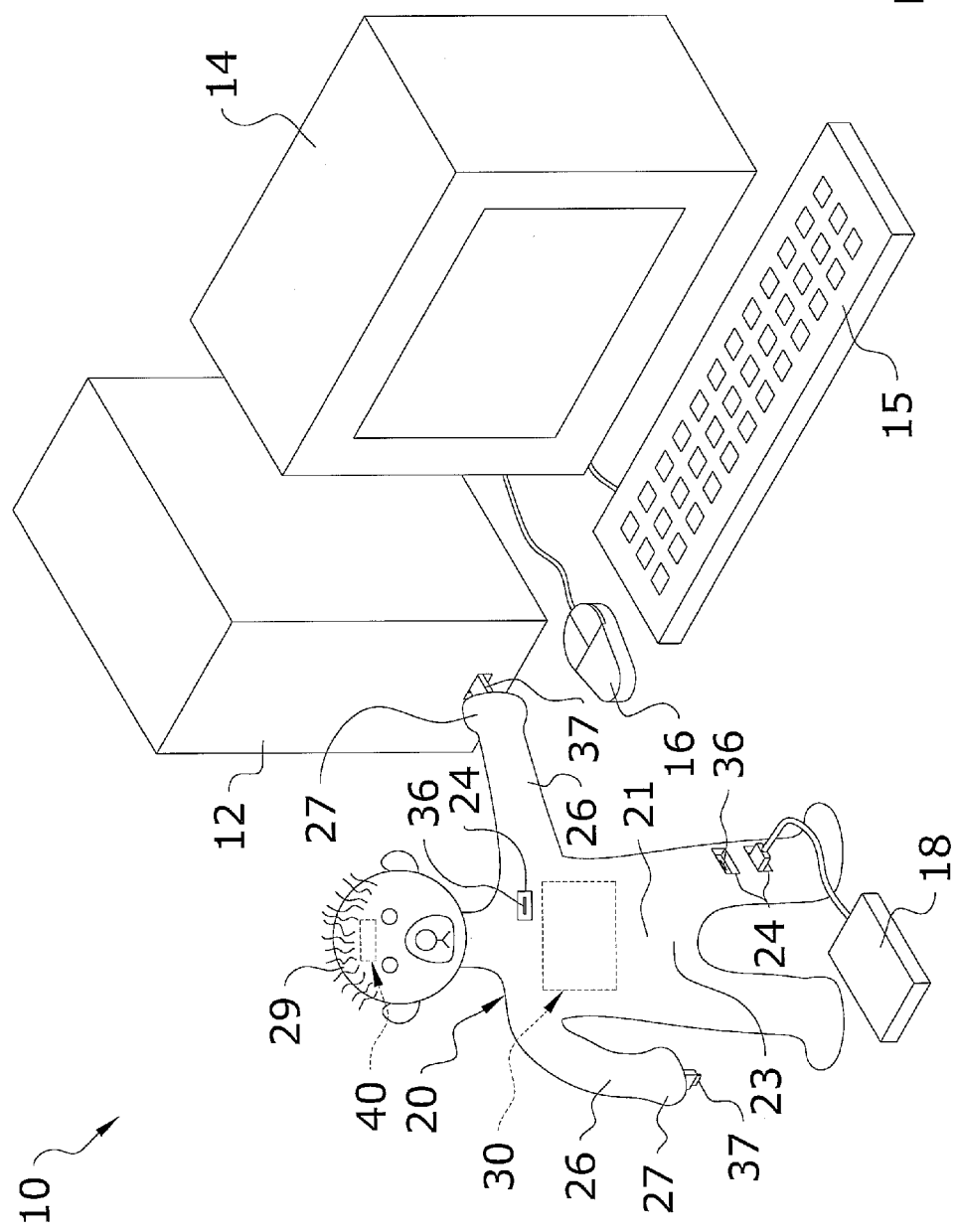
FIG. 2 is an upper perspective view of the first embodiment of the present invention connected to a host computer.
Figure 3:
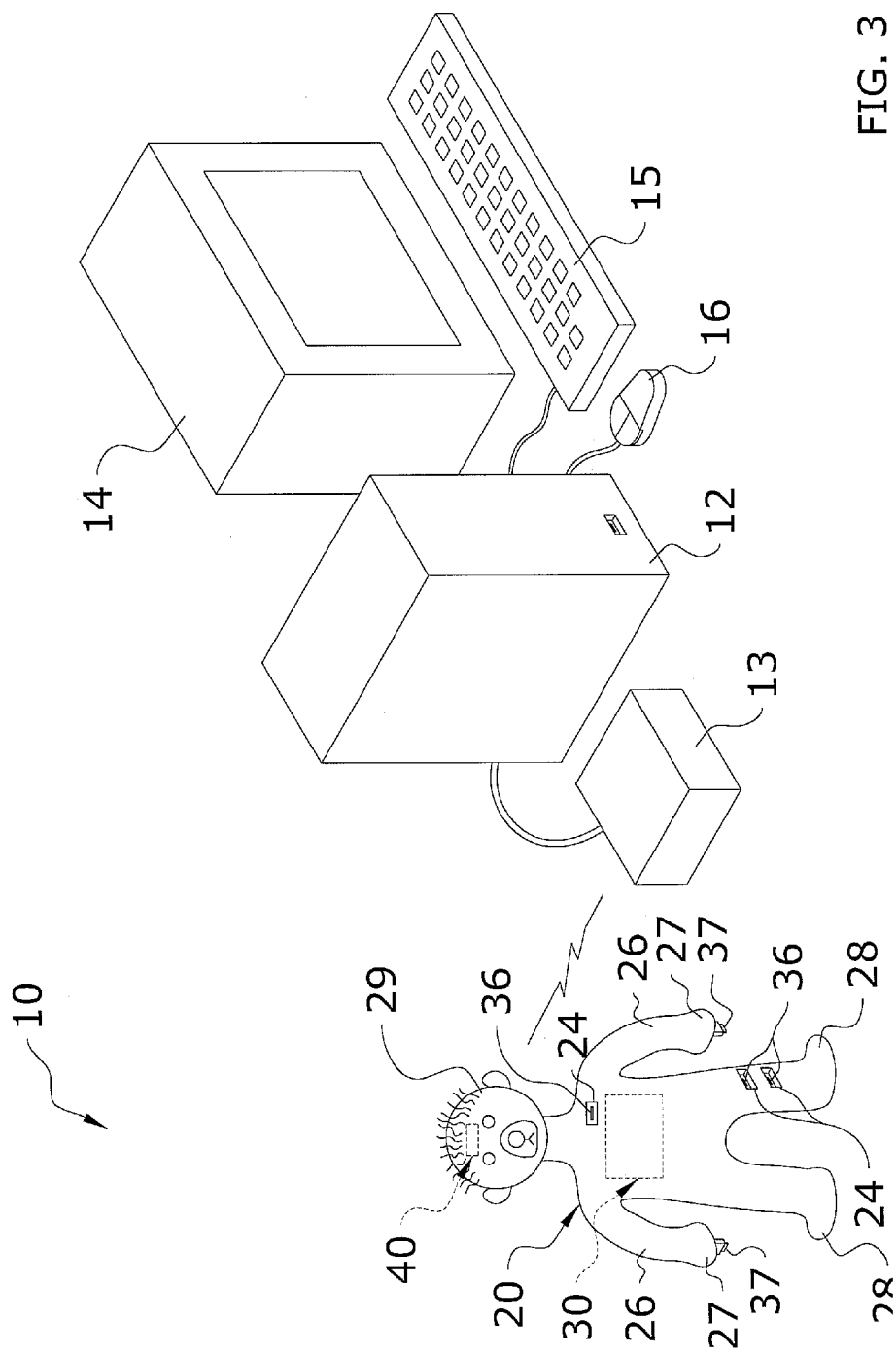
FIG. 3 is an upper perspective view of the first embodiment of the present invention illustrating the network adapter wirelessly connecting to the Internet via a modem, wherein the modem is connected to a host computer.

The computer system 30 of the present invention includes a memory device 31 within the enclosure 20 as illustrated in FIGS. 1 through 3. The memory device 31 is preferably comprised of a non-volatile and read/write memory system similar in flash drives common in the art. The memory device 31 may also include various other software programs preloaded upon the memory device 31. It is appreciated that the memory device 31 is of sufficient size (i.e. 512 MB, 1 GB, etc.) so as to adequately store the operating system, various software programs, applications and other various information.

Figure 4:
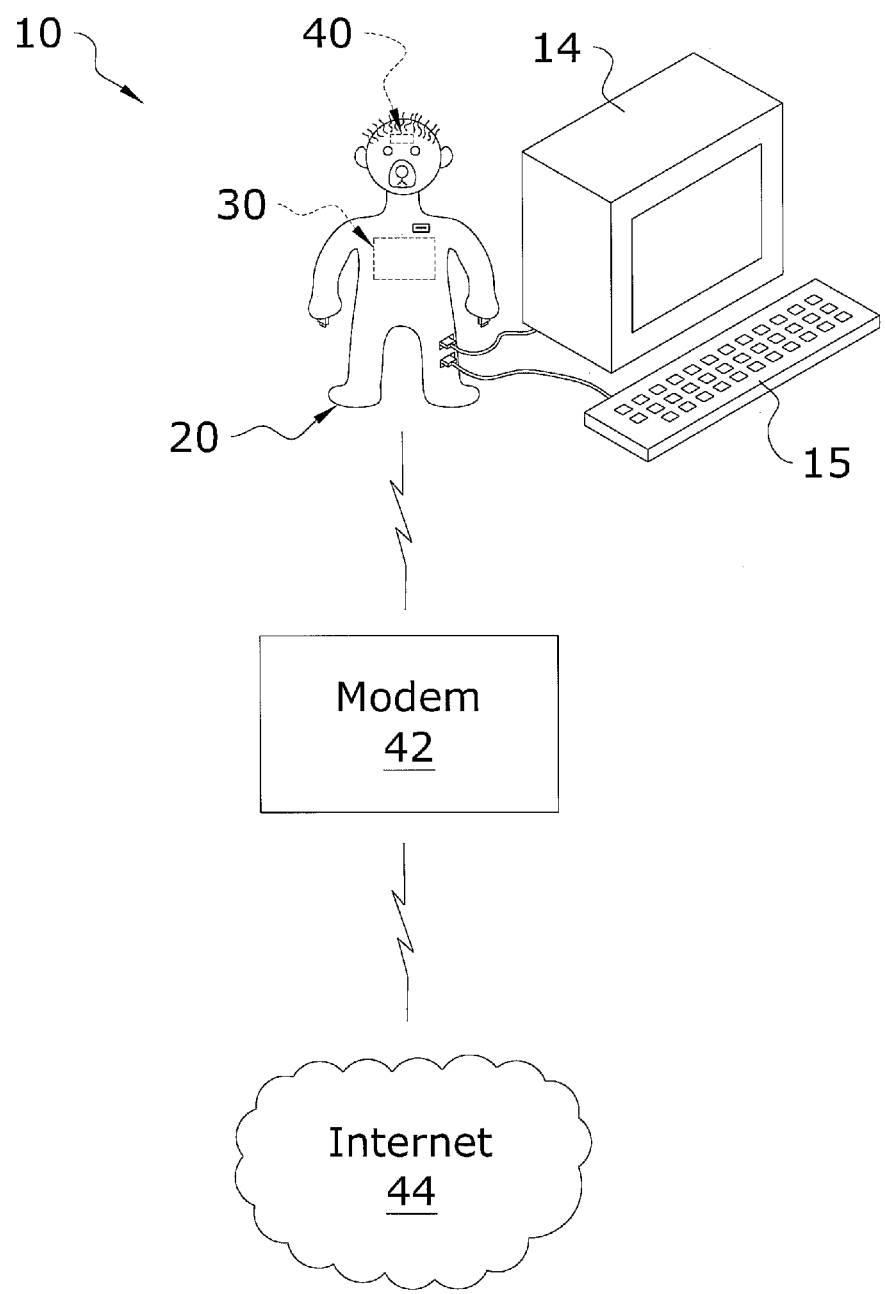
FIG. 4 is an upper perspective view of the first embodiment of the present invention illustrating the network adapter wirelessly connecting to the Internet via a modem.
Figure 5:
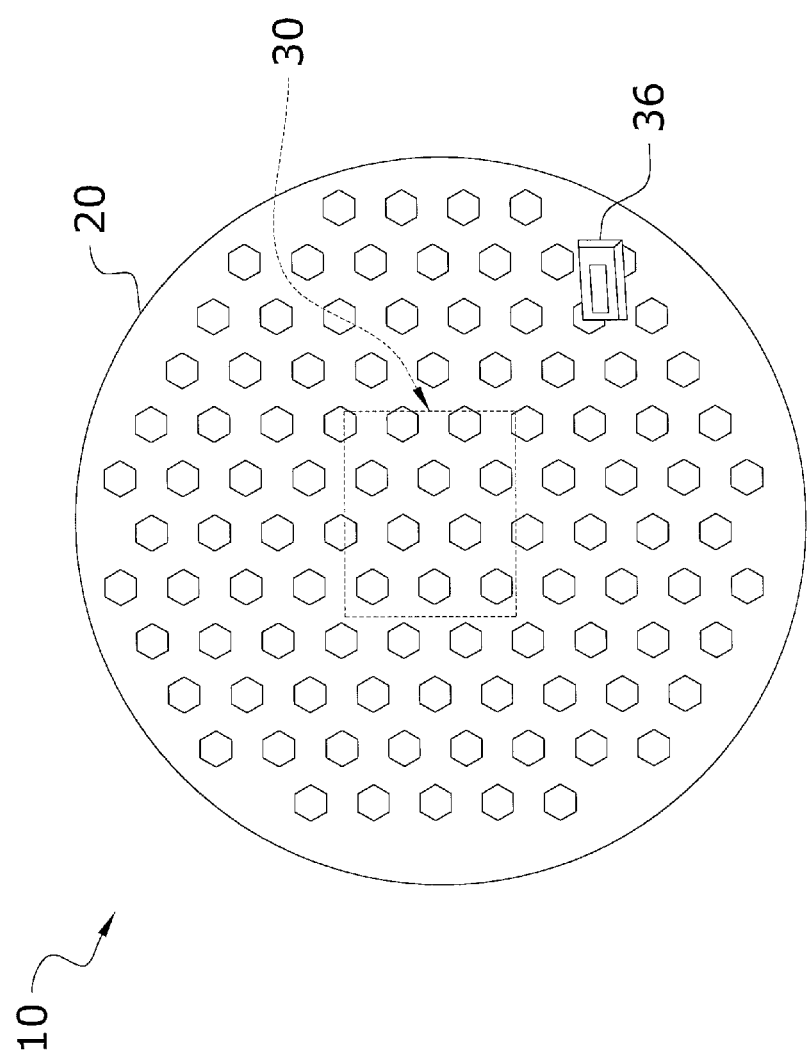
FIG. 5 is an upper perspective view of a second embodiment of the present invention, wherein the enclosure is configured as a golf ball.
Figure 6:
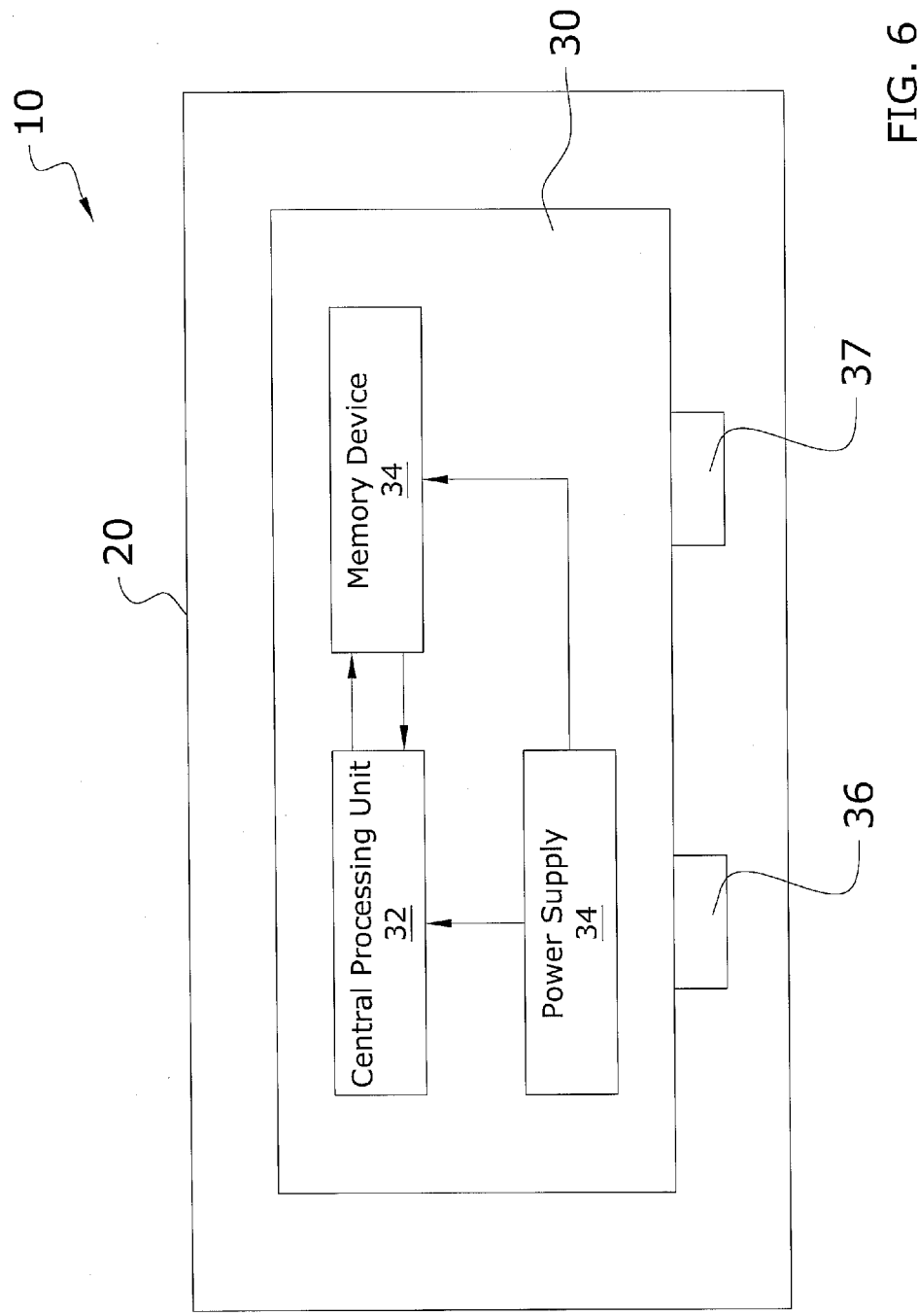
FIG. 6 is a diagram illustrating the computer system.
Figure 7:
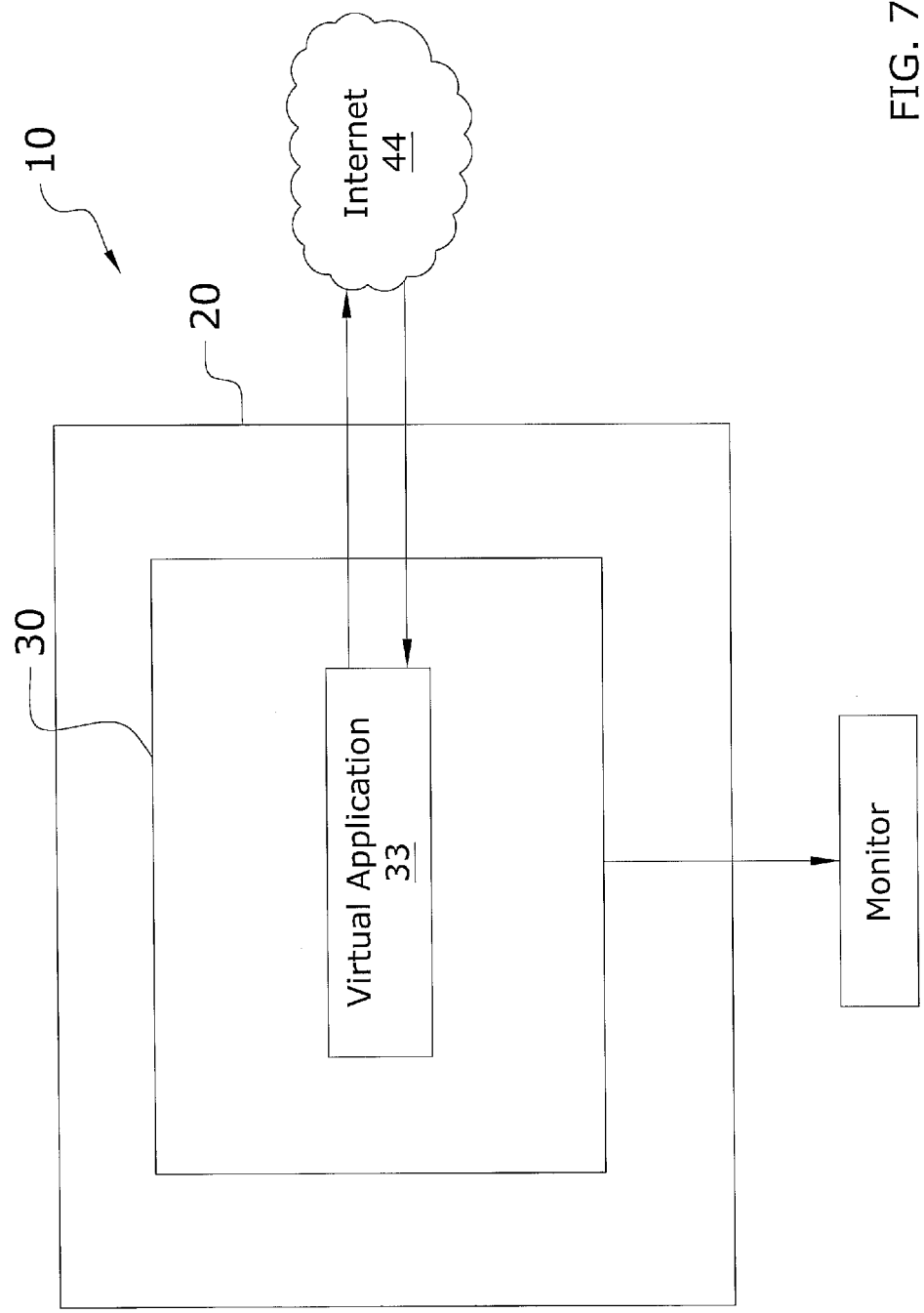
FIG. 7 is a diagram illustrating the virtual application as a web browser and communicating with the Internet and displaying the communicated information on a monitor, wherein the monitor is connected to the computer system.
Figure 8:
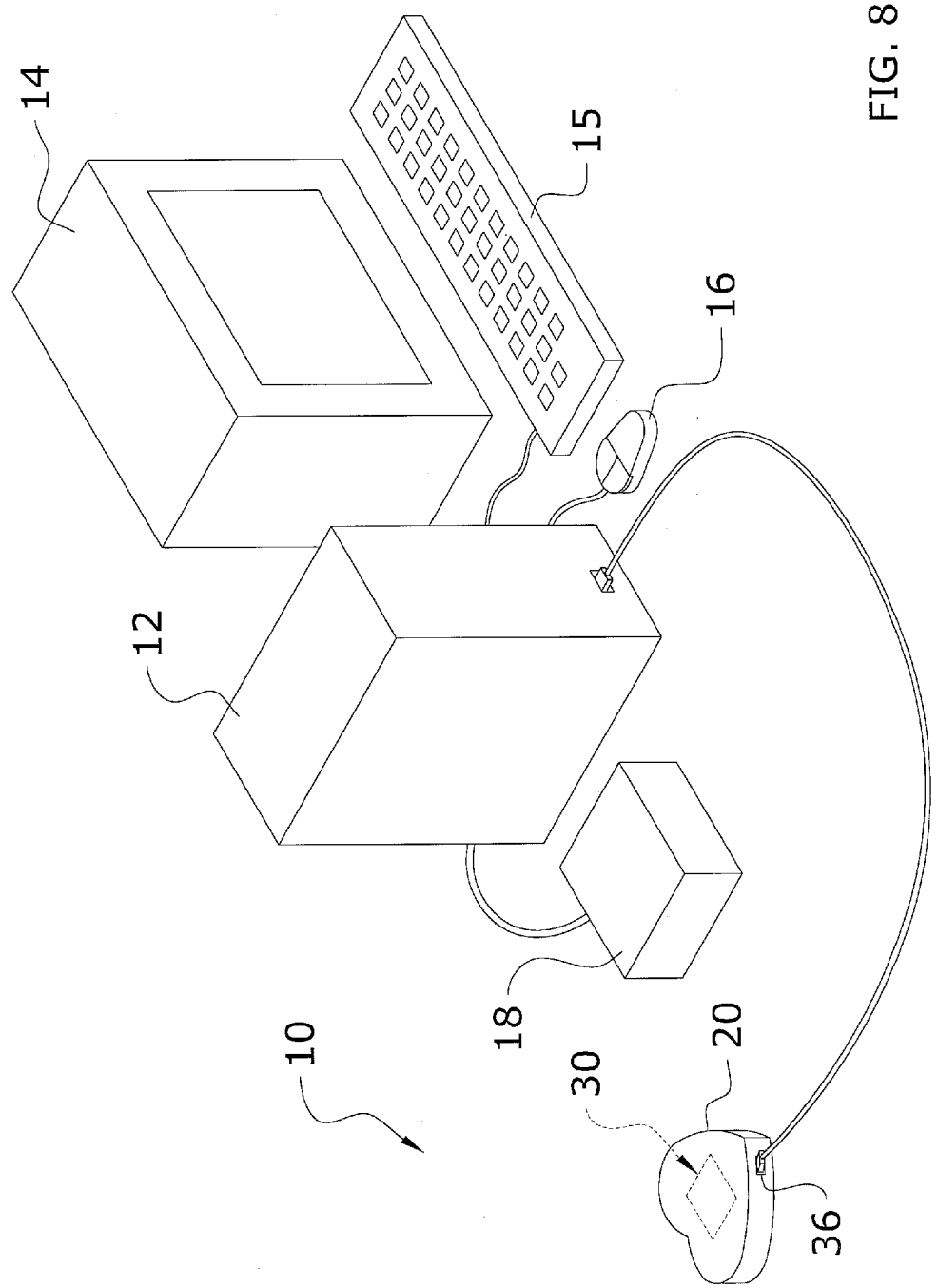
FIG. 8 is an upper perspective view of a third embodiment of the present invention connected to a host computer, wherein the enclosure is configured as a candy box packaging.
Figure 9:
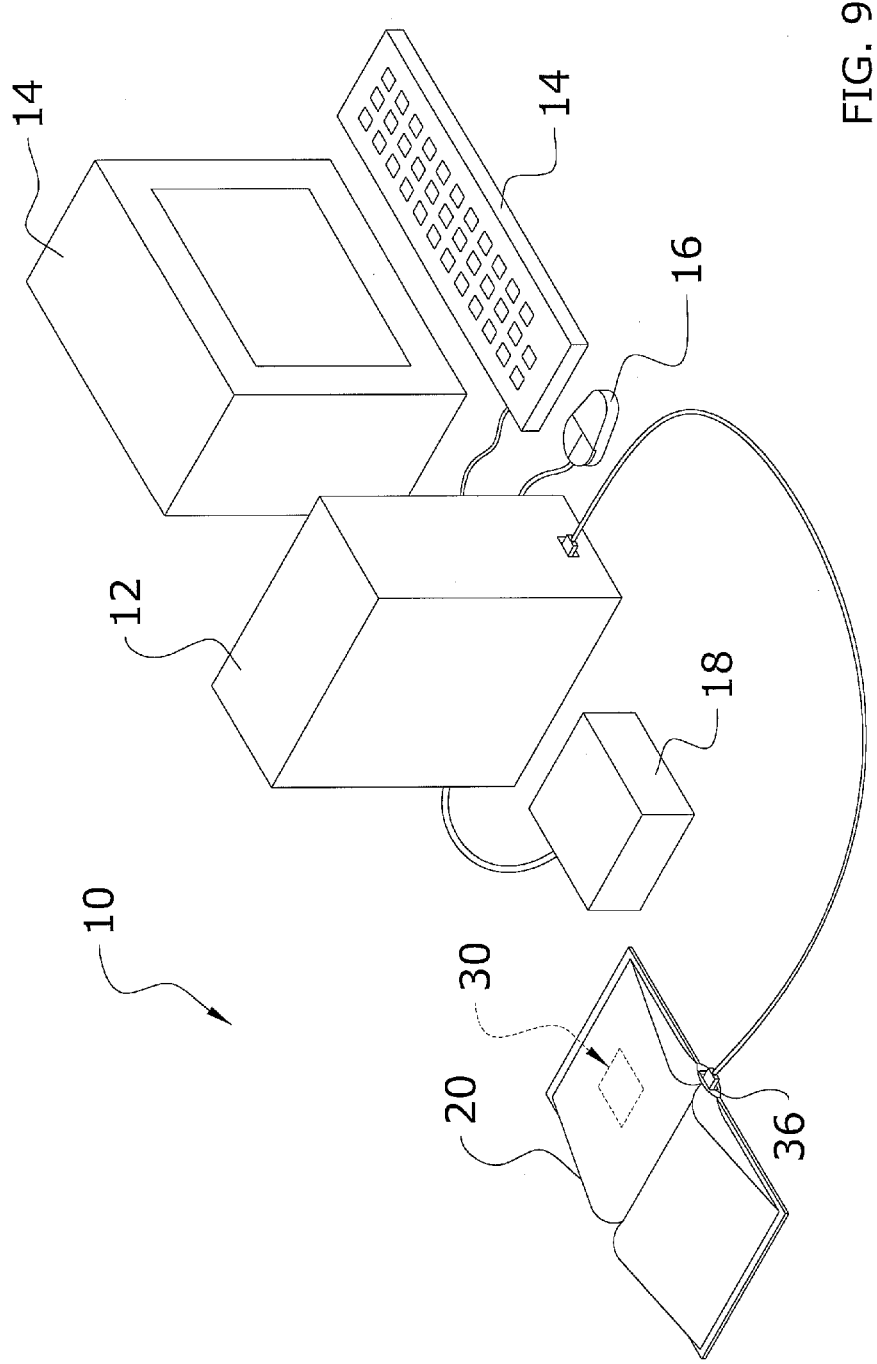
FIG. 9 is an upper perspective view of a third embodiment of the present invention connected to a host computer, wherein the enclosure is configured as a literature item.
Figure 10:
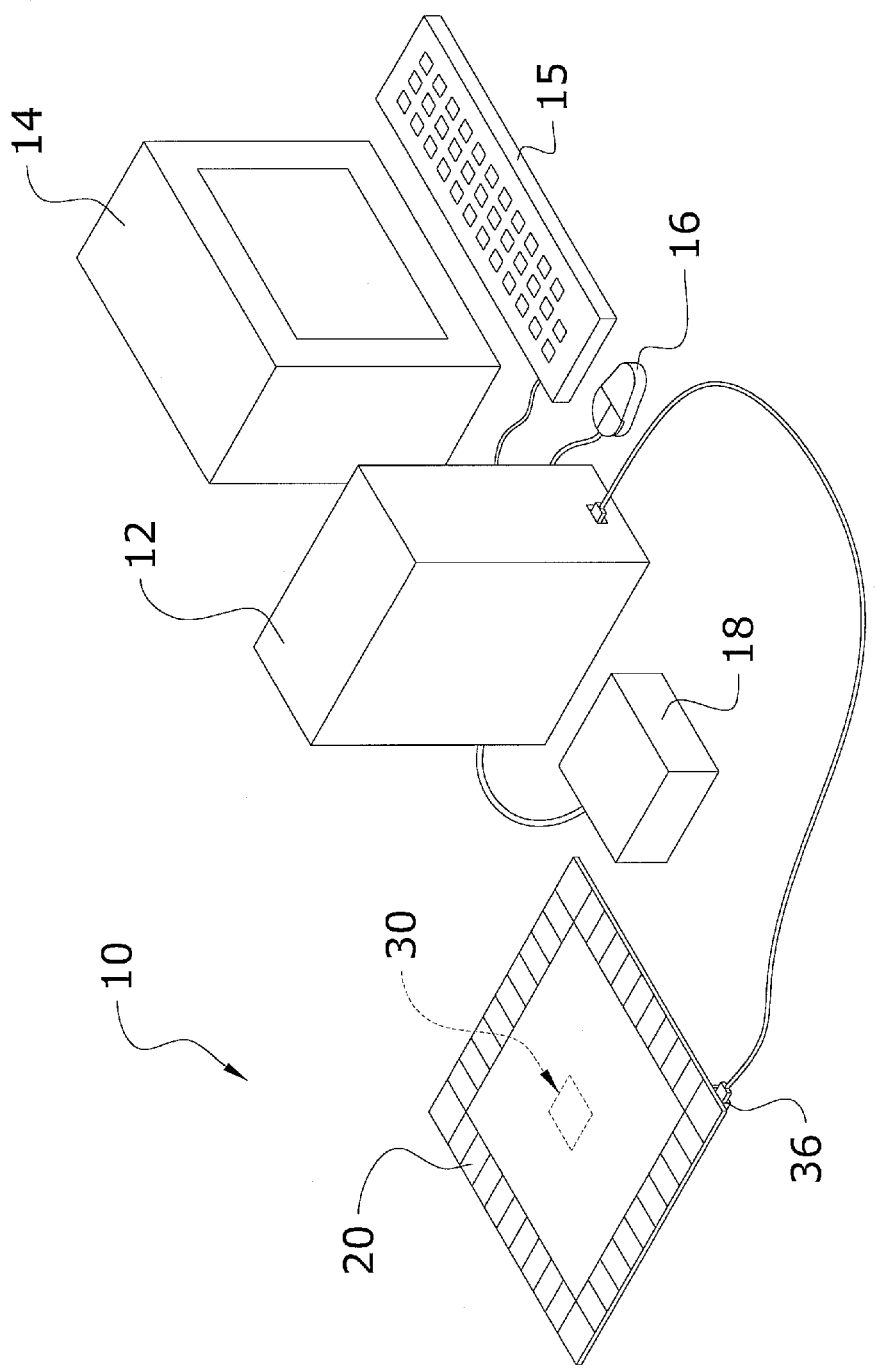
FIG. 10 is an upper perspective view of a third embodiment of the present invention connected to a host computer, wherein the enclosure is configured as a board game.
Figure 11:
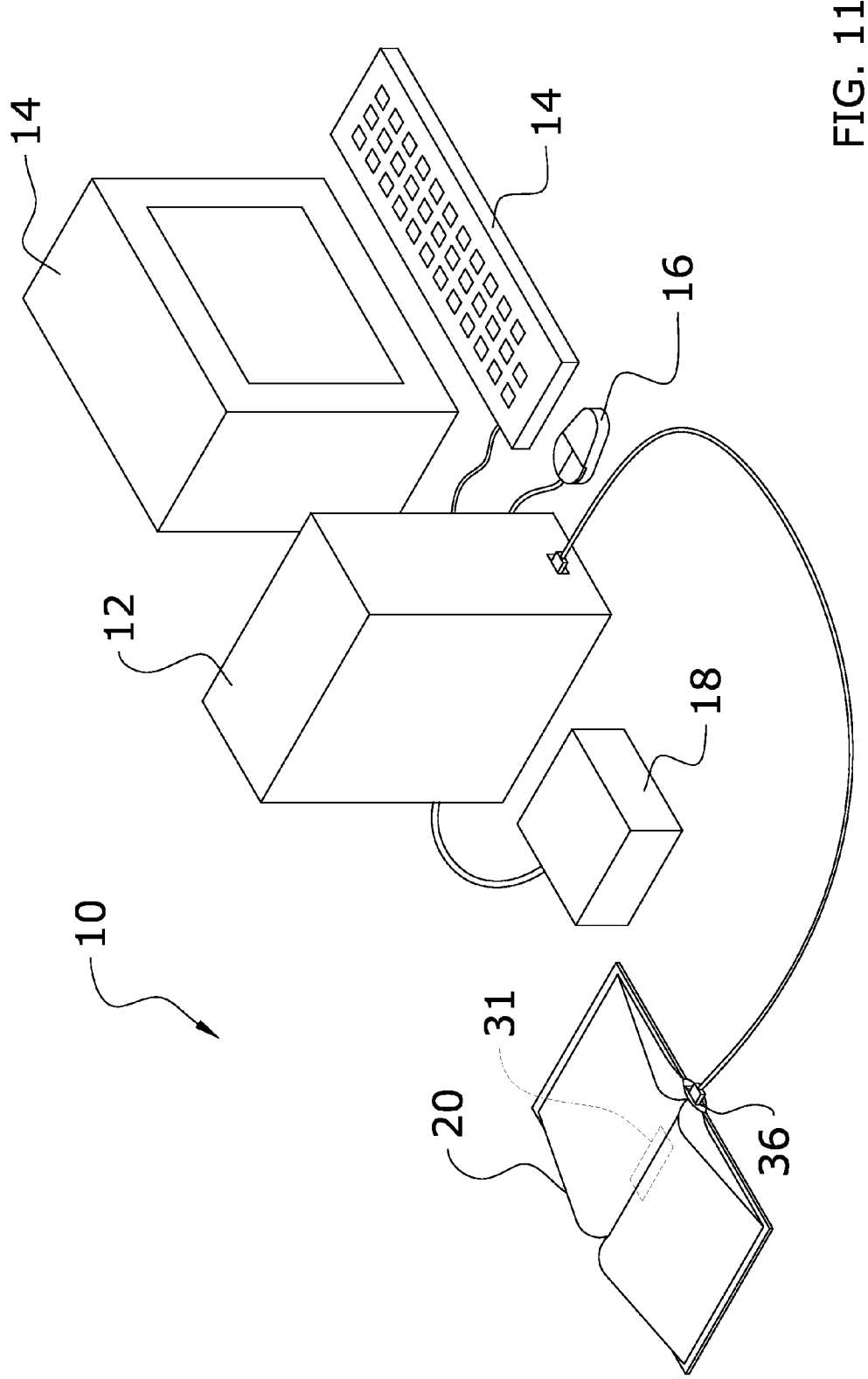
FIG. 11 is an upper perspective view of the enclosure comprised of a book and showing the memory device positioned within the binder.

The computer system 30 may be comprised of a standalone unit to be run independently of a host computer 12 or may require a host computer 12 to operate the computer system 30, such as when the computer system 30 does not include a central processing unit 32. When included, the central processing unit 32 is positioned within the enclosure 20 as illustrated in FIG. 4. The central processing unit 32 includes various electrical and mechanical computer components common in the art of personal computers, such as but not limited to a motherboard, registers, etc.

The computer system 30 may also include various other computer components common in the art of personal computers, such as but not limited to expansion cards (e.g. graphics card, sound card, network card, TV tuner card, modem, host adapters, etc.). The central processing unit 32 may further include virtual applications so as to run without a separate operating system. An operating system may be preloaded upon the memory device 31 and ran through the central processing unit 32. The operating system may be comprised of various types of operating systems, such as but not limited to MICROSOFT WINDOWS, LINUX, APPLE and various others.

The present invention preferably is adapted to run virtual applications 33 without an operating system, wherein the enclosure 20 may not include an operating system. The virtual application 33 could be comprised of various types of software applications, such as a web browser. The virtual application 33 (i.e. web browser) in turn can "act" as an operating system even though the virtual application 33 (i.e. web browser) is in fact an application. The virtual application 33 is stored upon the memory device 31 and ran by the central processing unit 32 of the present invention. The virtual applications may run via the host computer 12 or independently of the host computer 12.

For example, the central processing unit 32 may only have a web browser 33 running with content such as video. The video plays within the web browser 33 and the web browser 33 has no underlying operating system since the web browser 33 in fact "acts" as the operating system. The web browser 33 can also launch within the host computer 12 even though the web browser 33 may not be installed upon the host computer 12. The web browser 33 may also run independently outside of the host computer 12. It is appreciated that various types of virtual applications 33 may be used with the present invention rather than the web browser.

Any configuration of the enclosure 20 (e.g. board game, action figure, etc.) can have various different virtual applications 33. Various virtual applications 33 such as videos, music, games, new product catalogs or those with Adobe® Flash® based technology and custom content may be incorporated to be run virtually via the central processing unit 32 within the enclosure 20.

E. Connectors

The present invention also preferably includes various external peripheral connectors 36, 37, to connect to various peripheral devices (e.g. monitor 14, keyboard 15, mouse 16, memory storage device 18, printer, speakers, host computer 12, etc.). The connectors 36, 37 preferably include output connectors 37 and input connectors 36 as illustrated in FIGS. 1 through 4.

The connectors 36, 37 may also be comprised of various configurations common in the art of personal computer connectors, such as but not limited to USB connectors (expandable or nonexpendable), serial ports, parallel ports, wireless connectors, etc.). The present invention also preferably includes a network adapter 40 (i.e. Ethernet connector, wireless Internet connector, etc.) to connect to a modem 42 and subsequently connect to the Internet 44. It is appreciated that the network adapter 40 may also be comprised of a modem and directly connect to the Internet.

F. Host Computer

The host computer 12 may be utilized in conjunction with the present invention as illustrated in FIGS. 2 and 3. The host computer 12 may be comprised of various configurations; however it is appreciated that the host computer 12 is preferably comprised of a stand-alone personal computer common in the art. In the preferred embodiment the host computer 12 is utilized to access the operating system, the memory device 31, or various virtual applications 33.

Utilizing the host computer 12 with the operating system allows the user to utilize multiple operating systems (i.e. operating system of the enclosure and host operating system upon host computer 12) and memory devices 31. It is appreciated that the operating system may also be accessed via the Internet from the host computer 12 or vice versa. It is also appreciated that the host computer 12 may be utilized to run the virtual applications of the present invention.

G. Operation of Preferred Embodiment

In use, an output connector 37 of the present invention is preferably connected to an input connector 36 of the host computer 12. The host computer 12 and the central processing unit 32 are now powered on. The operating system 35 or virtual application 33 may now be virtually accessed through the host computer 12. Virtually accessing the operating system or virtual application of the present invention allows an individual to utilize the CPU and other peripheral devices (i.e. monitor 14, etc.) of the host computer 12 without disrupting the host computer's operating system (i.e. host computer's operating system is bypassed). The playful configuration of the enclosure 20 allows the for the present invention to be utilized by children of various ages and increases an attention and desire to use the present invention and thus increase the children's knowledge through the use of the central processing unit 32.

In a preferred embodiment, the computer system 30 of the enclosure 20 uses the processing unit 13 of the host computer 12, wherein the computer system 30 of the enclosure 20 does not necessarily include the processing unit 32. Thus, the processing unit 13 of the host computer 12 may be used to access and use the virtual application 33 or the virtual operating system 35 of the computer system 30.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An enclosure and operable storage system, comprising:
   a book having a computer system positioned therein;
   said computer system having a memory device;
   said computer system having a virtual application software and a virtual operating system stored upon said memory device, wherein said virtual operating system executes said virtual application software;
   wherein said computer system does not have a processing unit; and
   a host computer separate from said book, wherein said host computer has a processing unit and a host operating system installed thereon and wherein said host computer is communicatively connected to said book;
   wherein said host computer operates said virtual application software and said virtual operating system of said book through said processing unit and said host operating system of said host computer and displays content from said virtual application software and said virtual operating system;
   wherein said virtual application software and said virtual operating system of said computer system are virtually accessed by said host computer which permits use of said processing unit of said host computer but restricts disruption of said host operating system via bypassing said host operating system while virtually operating said virtual operating system to execute said virtual application software.

2. The enclosure and operable storage system of claim 1, wherein said virtual application software is comprised of a web browser, videos, music, games, or new product catalogs.

3. The enclosure and operable storage system of claim 1, wherein said book does not have a display connected to said computer system.

4. An enclosure and operable storage system, comprising:
   a portable enclosure having a computer system comprised of a structure to resemble or be comprised of a literary item, said literary item configuration is selected from the group consisting of books, magazines, and greeting cards;
   said computer system having a memory device enclosed within said portable enclosure;
   said computer system having a virtual operating system stored upon said memory device, wherein said virtual operating system executes virtual application software;
   wherein said computer system does not have a processing unit; and
   a host computer separate from said portable enclosure, wherein said host computer is communicatively connected to said portable enclosure, wherein said host computer has a processing unit;
   wherein said host computer operates said virtual operating system of said portable enclosure through said processing unit of said host computer and displays content from said virtual operating system.
   wherein said virtual operating system of said computer system is virtually accessed by said host computer which permits use of said processing unit of said host computer but restricts disruption of a host operating system of said host computer via bypassing the host operating system virtually while operating said virtual operating system to execute the virtual application software.

5. The enclosure and operable storage system of claim 4, wherein said portable enclosure comprises a book.

6. The enclosure and operable storage system of claim 5, wherein said memory device is positioned within a binder of said book.

7. The enclosure and operable storage system of claim 4, wherein said portable enclosure does not have a display connected to said computer system.

8. A computer system, comprising:
   a host computer having a processing unit, a host operating system, an electronic display, and at least one peripheral device;
   wherein said host operating system executes one or more software applications, and wherein said at least one peripheral device controls said processing unit;
   a portable computer system having a memory device, virtual application software, and a virtual operating system, wherein said virtual application software and said virtual operating system are stored upon said memory device;
   wherein said portable computer system is communicatively connected to said host computer such as to transfer electronic data;
   wherein said portable computer system does not have a processing unit or an electronic display;
   wherein said virtual operating system of said portable computer system executes said virtual application software via said processing unit of said host computer;

wherein said virtual operating system of said portable computer system bypasses said host operating system when executing said virtual application software to prevent disruption of said host operating system;

wherein said electronic display of said host computer shows content from said virtual application software thereon.

9. The computer system of claim 8, wherein said portable computer system is comprised of a structure to resemble or be comprised of a literary item, said literary item configuration is selected from the group consisting of books, magazines, and greeting cards.

10. The computer system of claim 9, wherein said portable enclosure comprises a book.

11. The computer system of claim 10, wherein said memory device is positioned within a binder of said book.

* * * * *